(12) United States Patent
Lei et al.

(10) Patent No.: US 6,772,742 B2
(45) Date of Patent: Aug. 10, 2004

(54) METHOD AND APPARATUS FOR FLEXIBLY REGULATING INTERNAL COMBUSTION ENGINE VALVE FLOW

(75) Inventors: Ning Lei, Oak Brook, IL (US); Qianfan Xin, Lake Zurich, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 137 days.

(21) Appl. No.: 10/087,282

(22) Filed: Mar. 1, 2002

(65) Prior Publication Data

US 2003/0164163 A1 Sep. 4, 2003

(51) Int. Cl.$^7$ ............................. F02M 25/07; F01L 1/34
(52) U.S. Cl. ............................. 123/568.14; 123/90.16; 60/602; 60/605.2
(58) Field of Search ............................. 123/90.11–90.18, 123/320–322, 347, 348, 568.11, 568.14; 60/602, 605.2

(56) References Cited

U.S. PATENT DOCUMENTS

| | | | | |
|---|---|---|---|---|
| 4,158,348 A | * | 6/1979 | Mason et al. | 123/321 |
| 4,510,900 A | * | 4/1985 | Quenneville | 123/321 |
| 4,981,119 A | | 1/1991 | Neitz et al. | |
| 5,603,292 A | * | 2/1997 | Hakansson | 123/568.14 |
| 5,813,231 A | | 9/1998 | Faletti et al. | |
| 5,839,400 A | * | 11/1998 | Vattaneo et al. | 123/568.14 |
| 6,050,093 A | | 4/2000 | Daudel et al. | |
| 6,095,115 A | * | 8/2000 | Fuchs | 123/321 |
| 6,125,828 A | * | 10/2000 | Hu | 123/568.14 |
| 6,148,616 A | * | 11/2000 | Yoshida et al. | 60/605.2 |
| 6,192,686 B1 | | 2/2001 | Coleman et al. | |
| 6,216,460 B1 | | 4/2001 | Shao et al. | |
| 6,220,233 B1 | | 4/2001 | Pierpont | |
| 6,223,646 B1 | | 5/2001 | Carroll et al. | |
| 6,230,695 B1 | | 5/2001 | Coleman et al. | |
| 6,354,254 B1 | * | 3/2002 | Usko | 123/568.14 |
| 6,405,707 B1 | * | 6/2002 | Feucht | 123/321 |
| 6,430,929 B2 | * | 8/2002 | Martin | 60/605.2 |
| 2002/0108600 A1 | * | 8/2002 | Houtz | 123/321 |

FOREIGN PATENT DOCUMENTS

EP 1 096 114 A2 4/1991

* cited by examiner

Primary Examiner—Willis R. Wolfe, Jr.
(74) Attorney, Agent, or Firm—Susan L. Lukasik; Dennis Kelly Sullivan; Jeffrey P. Calfa (57) ABSTRACT

In an internal combustion engine, a fixed engine valve timing profile may be combined with a variable profile produced by a valve actuator coupled to one or more engine valves. By controlling one or more engine valves independent of the fixed timing profile, engine gas flow may be more flexibly regulated, thereby optimizing engine performance under a wide variety of operating conditions. In one embodiment, enhanced internal exhaust gas recirculation (EGR) may be achieved. A turbocharger may be used, along with the control provided by the valve actuator, to further control engine gas flow. In this manner, the present invention facilitates greater control of engine gas flow with minimal cost and complexity.

31 Claims, 9 Drawing Sheets

METHOD AND APPARATUS FOR FLEXIBLY REGULATING INTERNAL COMBUSTION ENGINE VALVE FLOW

FIELD OF THE INVENTION

The present invention relates generally to internal combustion engines and, in particular, to a method for controlling operation of intake or exhaust valves independent of a fixed timing mechanism to provide flexible regulation of engine gas flow.

BACKGROUND OF THE INVENTION

There are three types of gas flow in an internal combustion engine: (1) the intake fresh air flow from intake port into cylinder; (2) the gas flow from cylinder into intake port and/or exhaust port; (3) the reverse exhaust gas flow from exhaust port and/or intake port into cylinder. These engine gas flows are controlled by valve timing and valve lift. All engine performance parameters (e.g., torque, emissions, fuel consumption) are directly affected by the gas flows. But the three types of gas flow have different roles or different weight of importance for a particular engine performance parameter. For example, for air-to-fuel ratio and engine power the intake fresh air flow has a major influence. For turbocharger speed the exhaust flow has a major influence. For the emissions level of NOx the internal EGR flow has a dominant influence.

It is well known that variable valve timing can address the trade-off in engine breathing characteristics restricted by a conventional camshaft. Variable valve timing allows valve timing to be optimized, hence the engine gas flow to be regulated for each firing operating condition to achieve the best engine performance (torque, emissions, fuel economy, etc).

Emissions is one of the most important aspects in engine performance. Engine gas flow is directly related to an important emissions-control technique, exhaust gas recirculation (EGR). It is well known that EGR is an effective technique for reducing NOx (nitrogen oxygen) emissions in internal combustion engines. Generally an EGR system causes some portion of the exhaust gases to be reintroduced into one or more combustion chambers. Typically, an external EGR system is used. External EGR flow is a special type of gas flow inducted from exhaust manifold into intake manifold through external tubing when back pressure (i.e., pressure at exhaust manifold) is higher than boost pressure (i.e., pressure at intake manifold). A majority of all EGR systems in production today are external EGR systems. An advantage of external EGR is that the recirculated exhaust gas can be cooled down before it flows back to the intake manifold and the combustion chambers. With cooled external EGR, engine volumetric efficiency is higher. However, cooled external EGR systems suffer from the accumulation of soot deposits in elements of the EGR system, such as the EGR cooler. This can cause deterioration in EGR flow efficiency over time and, hence, overall engine performance.

Figure 1:
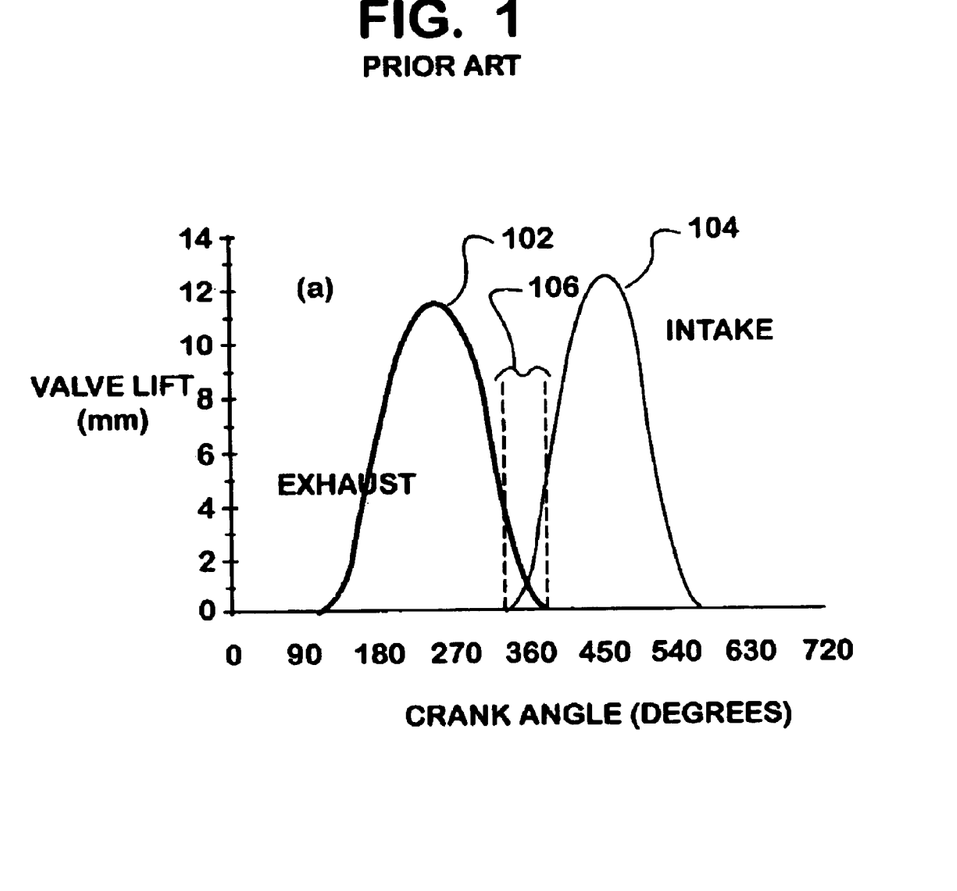
FIG. 1 is a graph illustrating valve lift profiles as a function of crankshaft angle in accordance with prior art techniques.

In an internal EGR system, the exhaust gas is kept inside the combustion chamber by inducting exhaust flow back into the cylinder from exhaust port (or manifold) and/or intake port (or manifold) without external tubing, i.e., through one or more engine valves. Therefore, internal EGR flow belongs to the above-mentioned third (3) gas flow type. Variable valve timing can provide optimized internal EGR level to achieve better emissions without the need of an external EGR system. The concept of internal EGR is further illustrated with reference to FIG. 1. FIG. 1 illustrates a graph of valve lift profiles (i.e., the level to which a valve is open) as a function of crankshaft angle for a typical 4-stroke engine. In particular, FIG. 1 illustrates an exhaust valve lift profile 102 and an intake valve lift profile 104. The four strokes are typically 0°–180° as expansion stroke; 180°–360° as exhaust stroke; 360°–540° as intake stroke; 540°–720°(or 0°) as compression stroke. These ranges may vary depending on the particular engine application. Usually, there exists an interval 106 centered around the transition between the exhaust stroke and the intake stroke, known as valve overlap, where both the intake valve and the exhaust valve are simultaneously open. During this interval 106, internal EGR occurs because the intake stroke causes some exhaust gases to be inducted back into the combustion chamber.

However, as known in the art, the operation of exhaust valves and intake valves is typically controlled through the mechanical profile of a fixed timing mechanism, e.g., a rotating camshaft. Because the geometry of the camshaft is fixed, the timing of the intake and exhaust valves is likewise fixed. As a result, the duration of any valve overlap as a function of crankshaft angle is also fixed. However, as the speed of engine increases, the duration of valve overlap as a function of time decreases, thereby providing less internal EGR. It is thus very difficult to satisfy the EGR demand at every engine condition when valve overlap is fixed as shown in FIG. 1.

Due to the pulsating nature of exhaust flow, it is feasible to increase the amount of internal EGR by holding the engine valves open at certain desirable periods outside of the scope of the mechanical cam profile when a favorable pressure difference exists. Thus, it would be advantageous to provide a system in which high levels of internal EGR flow rate may be achieved in an economic and effective fashion through variable valve actuation that is independent of the fixed timing mechanism.

As known in the art, another important function which can be achieved by using variable valve timing is engine braking. Most medium-duty and heavy-duty diesel engines today are equipped with a compression brake device comprising one or more valve actuators coupled to one or more exhaust valves. However, such devices are intended to be used only during engine braking but not in other operating conditions. As such, compression brake systems remain idle during most regular engine operation. One feature of compression brake devices is that its maximum stroke (or exhaust valve lift) is limited (for example, 2 mm) in order to prevent contact between the exhaust valve and piston at all operating conditions. Moreover, most compression brake devices have electro-hydraulic control features and are therefore flexible in timing control. These features are sometimes referred to as limited-stroke variable valve actuation (LSVVA).

Another trend in the automotive industry today is to develop a fully flexible air valve system or camless system. Camless system will bring tremendous advantages but are very complex and presently require significant development time and cost. Rather than switching directly to camless systems, it would be advantageous to enhance existing cam-driven valve systems with a certain degree of flexible control on opening/closing timing and valve duration. In this manner, engine manufacturers could fully utilize existing technologies to achieve the best performance with the least cost and complexity.

SUMMARY OF THE INVENTION

The present invention provides a technique to enhance existing fixed timing valve systems with flexible and independent control of the timing and lift of engine valves. To this end, the present invention is characterized by a mixed valve event combining the fixed timing profile with a variable profile produced by a valve actuator coupled to one or more engine valves. In a presently preferred embodiment, the valve actuator comprises a pressure-actuated piston coupled through a controllable fluid control valve to a source of pressurized hydraulic fluid. In this manner, the present invention facilitates the flexible regulation of engine intake and exhaust flow at different engine operating conditions. For example, the amount of internal EGR flow can be directly controlled and modulated, or engine braking can be applied as needed in vehicle operation. Additionally, operation of a turbocharger may be used, along with the desirable control provided by the valve actuator, for the purpose of controlling any of intake air flow, exhaust gas flow and/or internal EGR flow.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE PREFERRED EMBODIMENT

Figure 2:
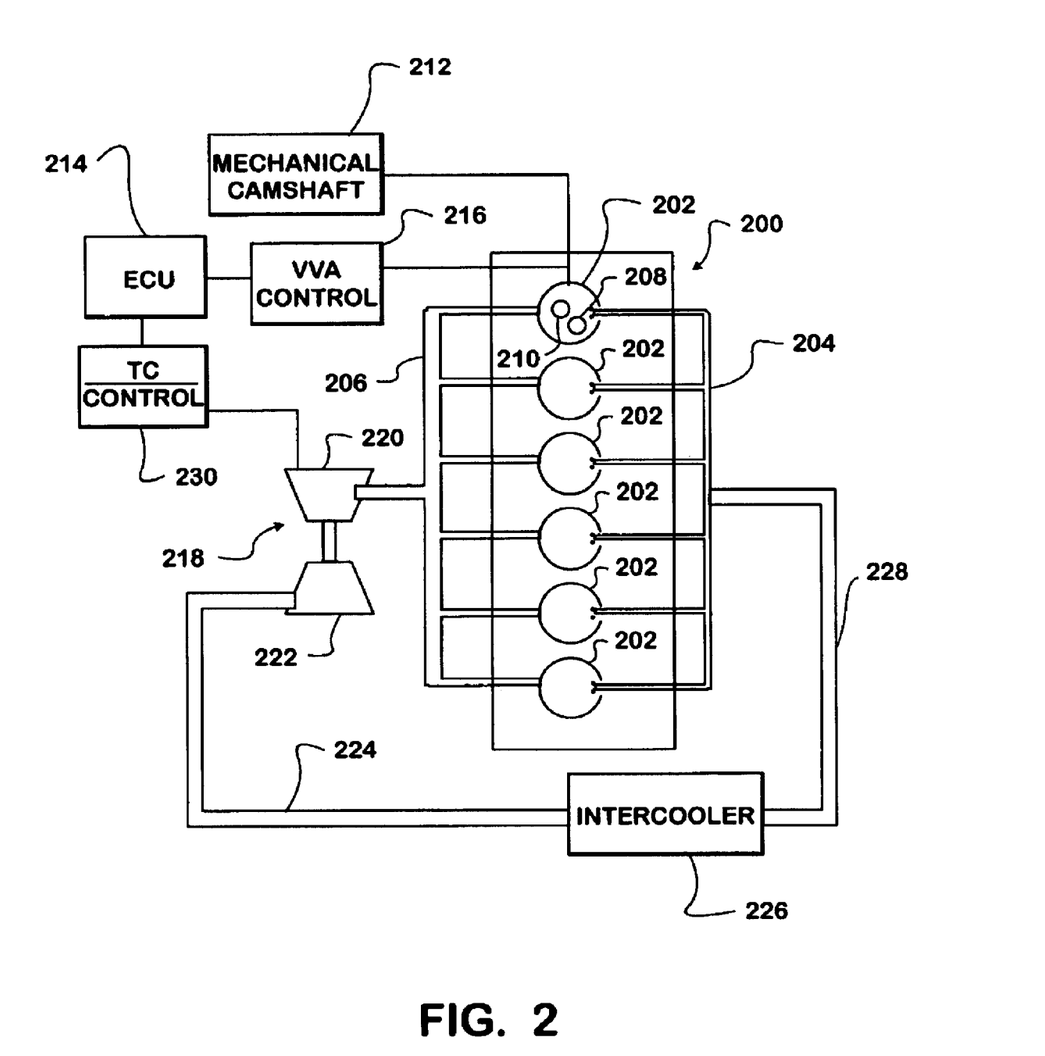
FIG. 2 is a schematic block diagram of an internal combustion engine in accordance with the present invention.

The present invention may be more readily described with reference to FIGS. 2–20. FIG. 2 illustrates an internal combustion engine 200 comprising a plurality of combustion chambers 202 in fluid communication with an intake manifold 204 and an exhaust manifold 206 via intake valves 208 and exhaust valves 210, respectively. In a presently preferred embodiment, the engine 200 comprises a four-stroke diesel engine, although the present invention may be beneficially applied to other types of internal combustion engines. For ease of illustration, only a single set of engine valves 208, 210 are shown; those having ordinary skill in the art will recognize that, in practice, each combustion chamber 202 has a correspond set of engine valves coupling the combustion chamber to the respective manifolds. Each set of engine valves 208, 210 are coupled to a fixed timing mechanism 212 that controls the times at which each engine valve or set of engine valves is open and closed. The fixed timing mechanism 212 typically comprises a camshaft rotating in synchronization with a crankshaft (not shown).

As known in the art, operation of the engine is generally controlled by an engine control unit (ECU) 214, which typically comprises a digital microcontroller, microprocessor or similar device. In particular, the ECU 214 is in communication with a variable valve actuation (VVA) control 216 which, as described in greater detail below, controls the operation of a valve actuator (not shown) coupled to one or more of the engine valves 208, 210. The type of communication path between the ECU 214 and VVA control 216 is at least partially dependent upon the type of device used to implement the VVA control 216 and is a matter of design choice. As described in greater detail below, the VVA control 216 preferably comprises a solenoid-equipped fluid control valve that responds to electrical signals provided by the ECU 214.

As shown in FIG. 2, the engine 200 also comprises a turbocharger 200 comprising a turbine 220 coupled to the exhaust manifold 206 and a compressor 222 coupled, via tubing 224, 228 and an intercooler 226, to the intake manifold 204. As known in the art, the turbocharger 218 operates by receiving exhaust gases from the exhaust manifold 206 which drive the turbine 220 and, in turn, the compressor 222. The compressor 222 pressurizes ambient air and provides it to the intake manifold 204. The intercooler 226 is provided to cool the pressurized air as needed. Operation of the turbocharger 218 may be controlled by the ECU 214 via an appropriate turbocharger control 230. In a presently preferred embodiment, the turbocharger 218 is capable of varying its performance and, in particular, comprises a variable-nozzle turbocharger (VNT). A VNT is normally used to regulate engine airflow at different speeds and loads to achieve better fuel economy, emissions and engine transient response than a fixed-nozzle turbocharger. As the nozzle vanes move, the pressure differential between the manifolds 204, 206 and the combustion chambers 202 is changed, and the turbocharger speed changes. Therefore, a VNT has the capability to alter engine flow rate, i.e., to regulate intake fresh air flow, exhaust gas flow and internal EGR flow.

Within an engine cycle, the intake manifold pressure does not fluctuate very much, but the exhaust manifold pressure fluctuates greatly during the four strokes, especially at high engine speed. Depending on the number of combustion chambers and exhaust manifold layout, there are several exhaust pressure pulses in each exhaust port within an engine cycle as a result of the firing pressure pulses of the neighboring combustion chambers. For example, for an in-line six-cylinder engine with undivided exhaust manifold, there are six exhaust pulses within each engine cycle, usually evenly distributed every 120° of crank angle. During the intake stroke, exhaust gas can be drawn back into the combustion chamber if the exhaust valve 210 is held open due to the pressure differential between the pulsating exhaust port pressure and the combustion chamber pressure. Moreover, if the intake valve 208 is held open during the exhaust stroke, exhaust gas can be driven into the intake manifold 204 and stored there because of the pressure differential between combustion chamber pressure and intake manifold pressure. Then, during the intake stroke, the stored exhaust gas is inducted into the combustion chamber. Arranging such valve events (e.g., delayed or retarded exhaust valve closure, or advanced intake valve opening)

appropriately can increase internal EGR. To this end, as well as the regulation of the other types of engine valve flow events, the present invention incorporates the use of one or more valve actuators to control engine valve events independent of the fixed timing mechanism.

Figures 3, 4:
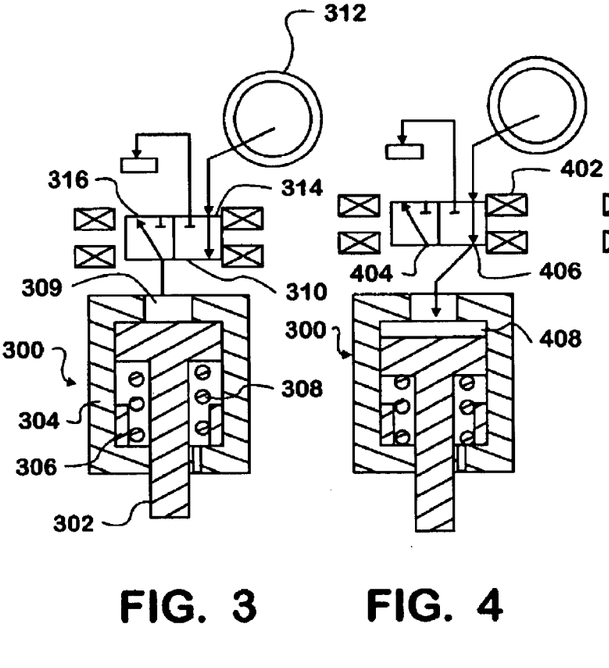
FIGS. 3–5 are schematic, cutaway illustrations of a valve actuator in accordance with the present invention.
Figure 5:
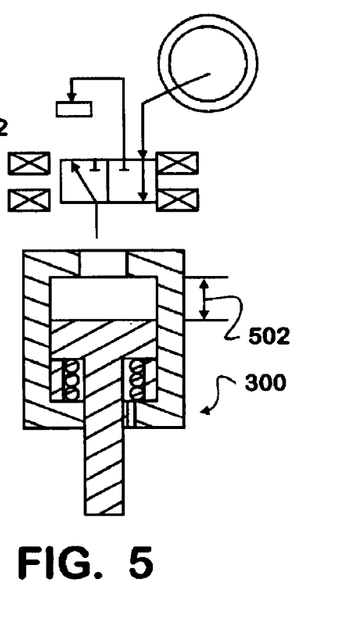

Referring now to FIGS. 3–5, a valve actuator 300 and its operation in accordance with a presently preferred embodiment is further described. Although not shown in FIGS. 3–5, the valve actuator 300 is generally mounted atop one or more of the engine valves to be controlled. The valve actuator 300 comprises a pressure-actuated piston 302 reciprocally engaged in a housing 304. A stroke limiter or stopper 306 limits the travel of the piston 302 within the housing 304, and a return spring 308 is provided to maintain the piston 302 in an un-extended position during a relaxed state, as shown in FIG. 3. A control mechanism is provided in the form of a 2-position, 3-port flow control valve 310 coupled to a source of pressurized hydraulic fluid 312, such as high-pressure engine oil that is regulated to sufficient pressure level at any given engine condition. In one embodiment of the present invention, the pressurized hydraulic fluid source 312 is the same source used to actuate fuel injectors (not shown) in accordance with known techniques. The output ports 404, 406 of the flow control valve 310 are coupled to an intake port 309 of the valve actuator 300. One supply port 314 of the flow control valve 310 is coupled to the high-pressure source 312, and one vent port 316 of the flow control valve 310 is coupled to a low-pressure fluid return reservoir. The flow coritrol valve 310 has two positions: opened and closed. In the closed position, as shown in FIGS. 3 and 5, the intake port 309 is vented to the low-pressure return and the piston 302 remains in an un-extended state.

When the flow control valve 310 is switched to an open position (for example, through the activation of a solenoid 402), the pressurized hydraulic fluid from the source 312 flows into the intake port 309 and, as the pressure placed on the actuator piston 302 overcomes the resistance of the return spring 308 and the engine valve (not shown) to which the piston 302 is coupled, into a chamber 408 above the actuator piston 302. Simultaneously, the piston 302 extends out of the housing 304 thereby causing the engine valve to open. If this actuation occurs at valve opening before an engine valve is actuated by the camshaft, the engine valve is pushed open by the actuator piston until the camshaft catches up and continues the cam-driven valve motion. If this actuation occurs at valve closing after the engine valve is actuated by camshaft, the valve seats on the piston 302 until the valve actuator 300 is deactivated or returned to its resting state (FIG. 3). FIG. 5 illustrates the full-open position of the piston 302. Note that the full stroke 502 of the piston 302 is limited by the stroke limiter 306. By design, the full stroke 502 is preferably limited (e.g., 1–3 mm.) to prevent the engine valve from extending into the combustion chamber to such a degree as to come into contact with a piston head.

The opening duration pulse width of the flow control valve 310 determines the duration of actuator piston 302 in an extended position. At the end of opening duration, the flow control valve is switched to venting position, and the hydraulic fluid flows from the chamber 408 to ambient. The spring 308 returns the actuator piston 302 back to its resting position. In this manner, the valve actuator 300 can provide very flexible timing of the opening, closing and duration of engine valves due to the valve actuator's independent control system. Virtually any valve lift profile may be created by combining the fixed timing of a mechanical cam system with the variable control of one or more valve actuators 300, particularly valve lift profiles giving rise to enhanced internal EGR performance. This combined operation is further illustrated with reference to FIGS. 6–8.

Figure 6:
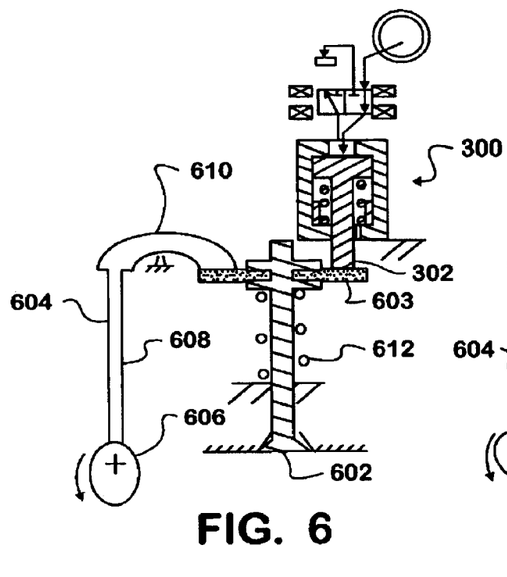
FIGS. 6–8 are schematic, cutaway illustrations showing operation of a valve actuator in conjunction with a fixed timing mechanism in accordance with one embodiment of the present invention.
Figure 7:
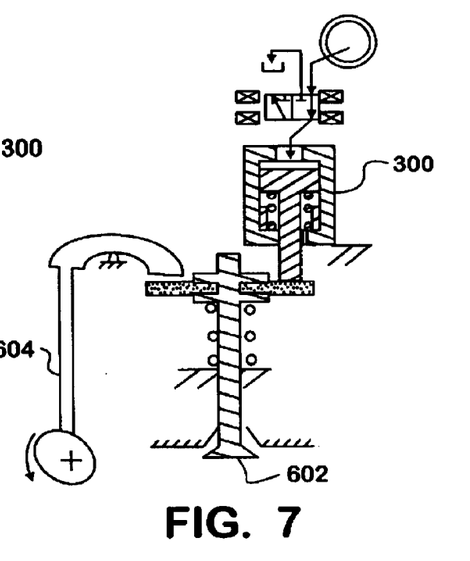
Figure 8:
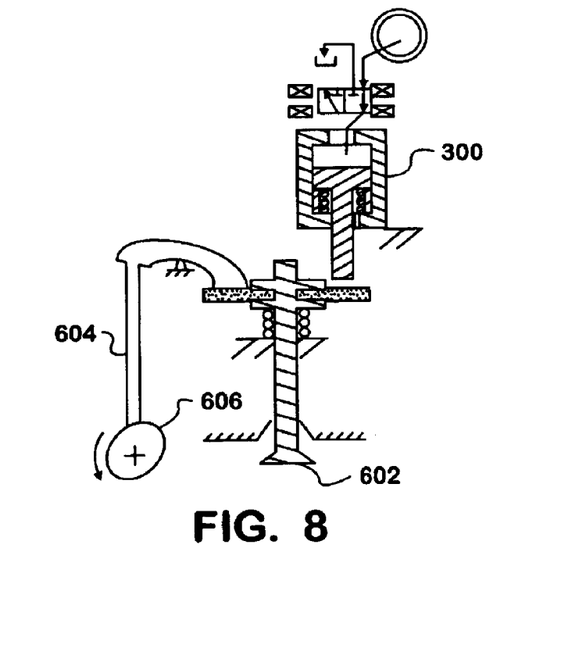

As shown in FIGS. 6–8, an engine valve 602 (in this case, comprising an extension member 603) is coupled to both the valve actuator 300 (via the actuator piston 302) and a cam system 604 comprising a rotating cam 606 engaging a push arm 608 and rocker arm 610. In its resting state (FIG. 6), the engine valve 602 is biased to a closed position by a valve spring 612. Note that, in general, the engine valve 602 may be either an exhaust or intake valve. Regardless, lift (opening) of the engine valve 602 can be triggered by either the cam system 604 or valve actuator 300. If the valve actuator 300 is off (i.e., not actuated), lift of the engine valve 302 and opening/closing timing are completely controlled by the cam system 604, and there is no operational difference from a conventional cam-driven valve scheme. However, if the valve actuator 300 is in use (i.e., actuated), the cam-driven valve motion can either be interrupted and/or rendered ineffective for a period in which valve lift is less than the stroke limit of the valve actuator 300. This is further illustrated in FIGS. 7 and 8.

In FIG. 7, rotation of the cam 606 is such that the cam system 604 does not induce valve lift. However, actuation of the valve actuator 300 causes the actuator piston 302 to engage and lift the engine valve 602. The amount of lift induced by the valve actuator 300 up to its stroke limit is referred to herein as a low-lift portion of the valve lift profile. The valve lift illustrated in FIG. 7 (and up to the stroke limit of the valve actuator) gives rise to either advanced valve opening or retarded valve closing; in either case, the cam system 604 does not drive the valve 602. FIG. 8 illustrates rotation of the cam 606 such that the cam system 604 induces valve lift in accordance with the fixed geometry of the cam system 604. The region of valve lift beyond the stroke limit of the valve actuator 300, an hence controlled exclusively by the cam system 604, is referred to herein as a high-lift portion of the valve lift profile. This is further illustrated in FIG. 8 where, despite the full stroke extension of the actuator piston 302, lift of the engine valve 602 is controlled by only the cam system 604. In this situation, the engine relies on the normal cam motion to fulfill its breathing requirement.

The independent control of the low-lift portion of a valve lift profile (or variable valve timing) provided by the present invention can regulate engine valve flow flexibly. For example for internal EGR, by retarding exhaust valve closing, internal EGR flow is increased due to the reverse exhaust gas flow driven by the pressure differential between the exhaust pressure and the combustion pressure during the intake and compression strokes. By advancing intake valve opening, exhaust gas is introduced into the intake manifold and stored there due to the pressure difference between the higher combustion chamber pressure (or exhaust pressure pulse) and lower intake manifold pressure during the exhaust and expansion strokes. Thereafter, during the intake stroke, the exhaust gas stored in the intake manifold is inducted into the combustion chamber and internal EGR is increased. Various examples of variable valve timing and lift events are further illustrated with reference to FIGS. 9–15.

Figure 9:
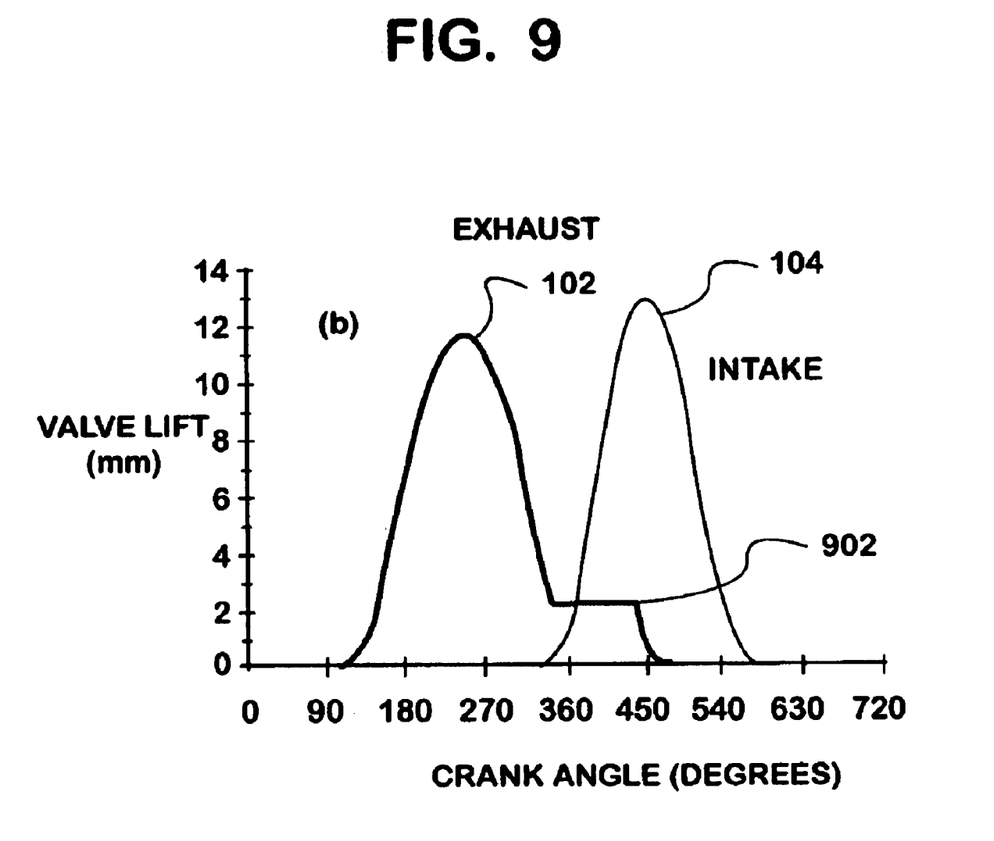
FIGS. 9–15 are graphs illustrating various exemplary valve lift profiles as a function of crankshaft angle that may be achieved through use of the present invention.

FIGS. 9–15 show the flexibly regulated valve profiles for regulating engine valve flow. These variable valve timings provides better control on intake fresh air flow, exhaust flow and internal EGR flow. Many engine performance parameters can be improved correspondingly, including volumetric efficiency, air-to-fuel ratio, pumping loss, expansion work, turbocharger speed, internal EGR rate, emissions, etc. In FIG. 9, an example of a retarded exhaust valve closing (EVC) event 902 is illustrated. The retarded EVC event is produced by the limited stroke of a valve actuator. Just before the transition from the exhaust stroke to the intake stroke, a valve actuator coupled to the exhaust valve is actuated to its full stroke, for example, 2 mm. Thus, after following the cam motion, the exhaust valve seats on the actuator piston at 2 mm lift until the actuator piston is retracted back to zero lift. Because the closing of the exhaust valve has been retarded, valve overlap is increased and, consequently, internal EGR flow is likewise increased.

Figure 10:
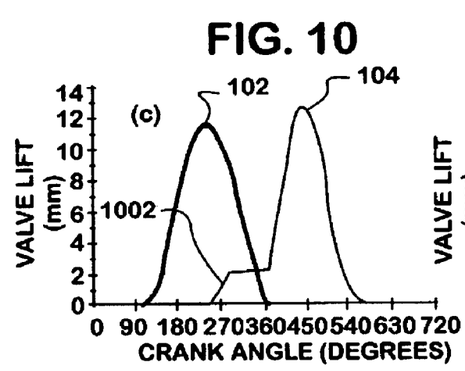
Figure 11:
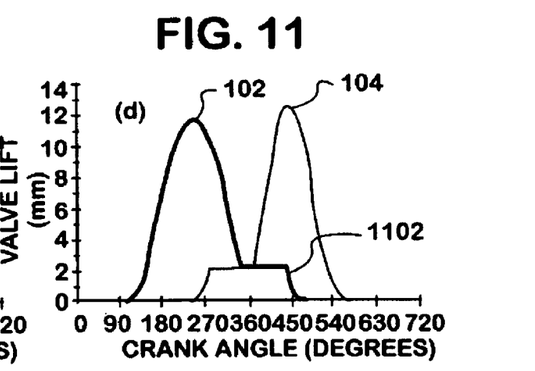

FIG. 10 shows an advanced intake valve opening (IVO) event 1002 with a step profile produced by the valve actuator. In this case, increased valve overlap and internal EGR flow are caused by the advancement of the IVO. FIG. 11 shows both a retarded EVC event 1102 and an advanced IVO event 1104. In this case, both the exhaust valve and the intake valve are coupled to one or more valve actuators.

Figure 12:
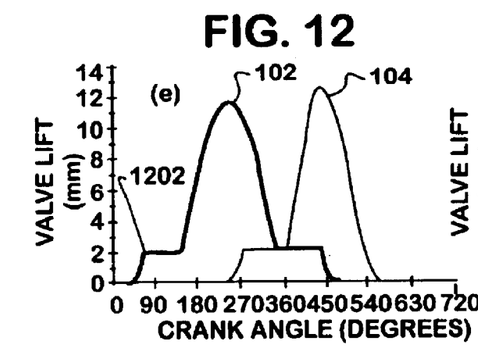
Figure 13:
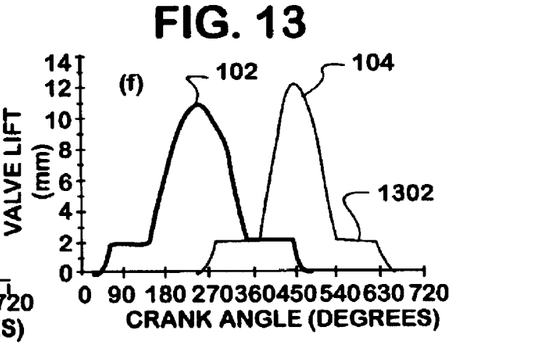
Figure 14:
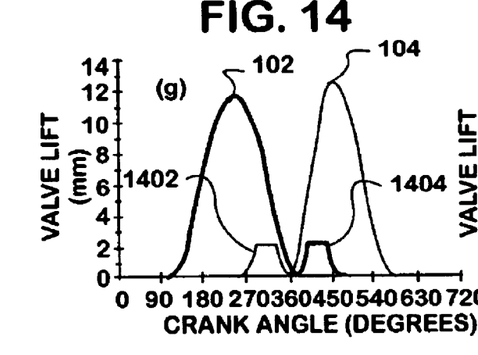

FIGS. 12 and 13 illustrate various valve events in addition to those shown in FIG. 11. In FIG. 12, an advanced exhaust valve opening (EVO) event 1202 is shown, and in FIG. 13, a retarded intake valve closing (IVC) event 1302 is shown. FIG. 14 shows an early deactivation of a valve actuator during an advanced IVO event 1402, and a late actuation of a valve actuator during a retarded EVC event 1404, resulting in a shorter step-profile than the profiles in the previous figures. In this manner, a greater degree of valve overlap and, hence, internal EGR flow can be realized.

Figure 15:
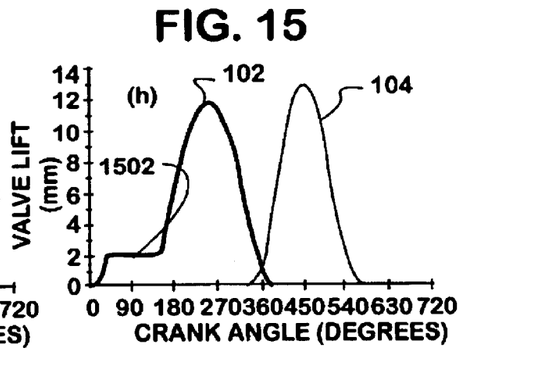

Those having ordinary skill in the art will recognize that the present invention need not be limited to providing control of valve events to enhance internal EGR flow. For example, the present invention may be used in an engine braking operation. This is shown in FIG. 15 in which an advanced EVO event 1502 is provided at the end of compression stroke and lasting through the duration of the expansion stroke to effectuate engine braking, as known in the art. As those having ordinary skill in the art will appreciate, still other beneficial effects may be realized through the variable valve control provided by the present invention as a matter of design choice.

Figure 16:
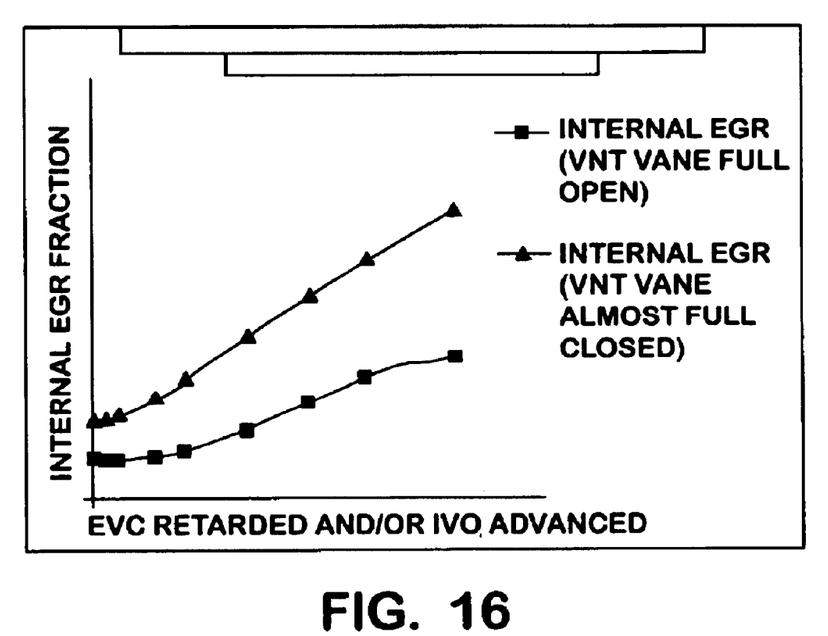
FIG. 16 is a graph illustrating internal EGR performance as a function of variable valve events and variable turbocharger control in accordance with the present invention.
Figure 17:
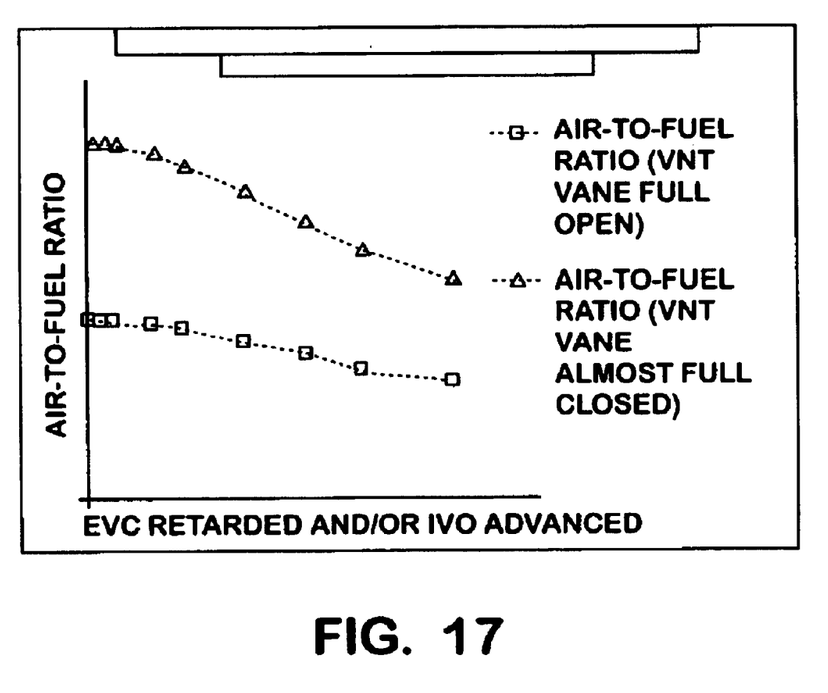
FIG. 17 is a graph illustrating air-to-fuel ratio as a function of variable valve events and variable turbocharger control in accordance with the present invention.

FIGS. 16 and 17 illustrate engine performance as judged by internal EGR fraction and air-to-fuel ratio, respectively, as a function of retarded EVC and/or advanced IVO for various turbocharger configurations. The use of a turbocharger can further regulate engine gas flow, including intake fresh air flow, exhaust flow through turbine and internal EGR flow, to enhance overall engine performance. As described above, internal EGR flow increases with retarded EVC and/or advanced IVO, as shown by the curves illustrated in FIG. 16. However, the separate curves of FIG. 16 also illustrate that significant increases in internal EGR flow may be realized by the appropriate turbocharger control. In the example of FIG. 16, it is assumed that a variable-nozzle turbocharger is employed. When the variable-nozzle turbocharger's vanes is set to a more closed position, more exhaust gas flows back into cylinder from exhaust port due to the increase in exhaust manifold pressure, and NOx emission is accordingly reduced. When internal EGR increases, air-to-fuel ratio decreases. However, with more closed nozzle vane settings, back pressure and boost pressure are increased with increased turbocharger speed. By increasing the turbocharger speed and the resulting higher boost pressure, more fresh airflow is inducted through the intake valve, and a high air-to-fuel ratio can be maintained to favor the reduction in soot emission. This is illustrated in FIG. 17.

It should be noted that, normally, an excessively closed nozzle vane position can cause significant increase in brake specific fuel consumption (BSFC). At high engine speed, or at low speed with a low load, because the air-to-fuel ratio is normally high, the present inventive method can achieve high amount of internal EGR without significant BSFC penalty with reasonable nozzle vane closure (i.e. not excessive vane closure). With the present invention, much higher amounts of internal EGR flow can be achieved with good air-to-fuel ratio, in comparison with that achieved by conventional cam profiles without a variable-nozzle turbocharger.

Figure 18:
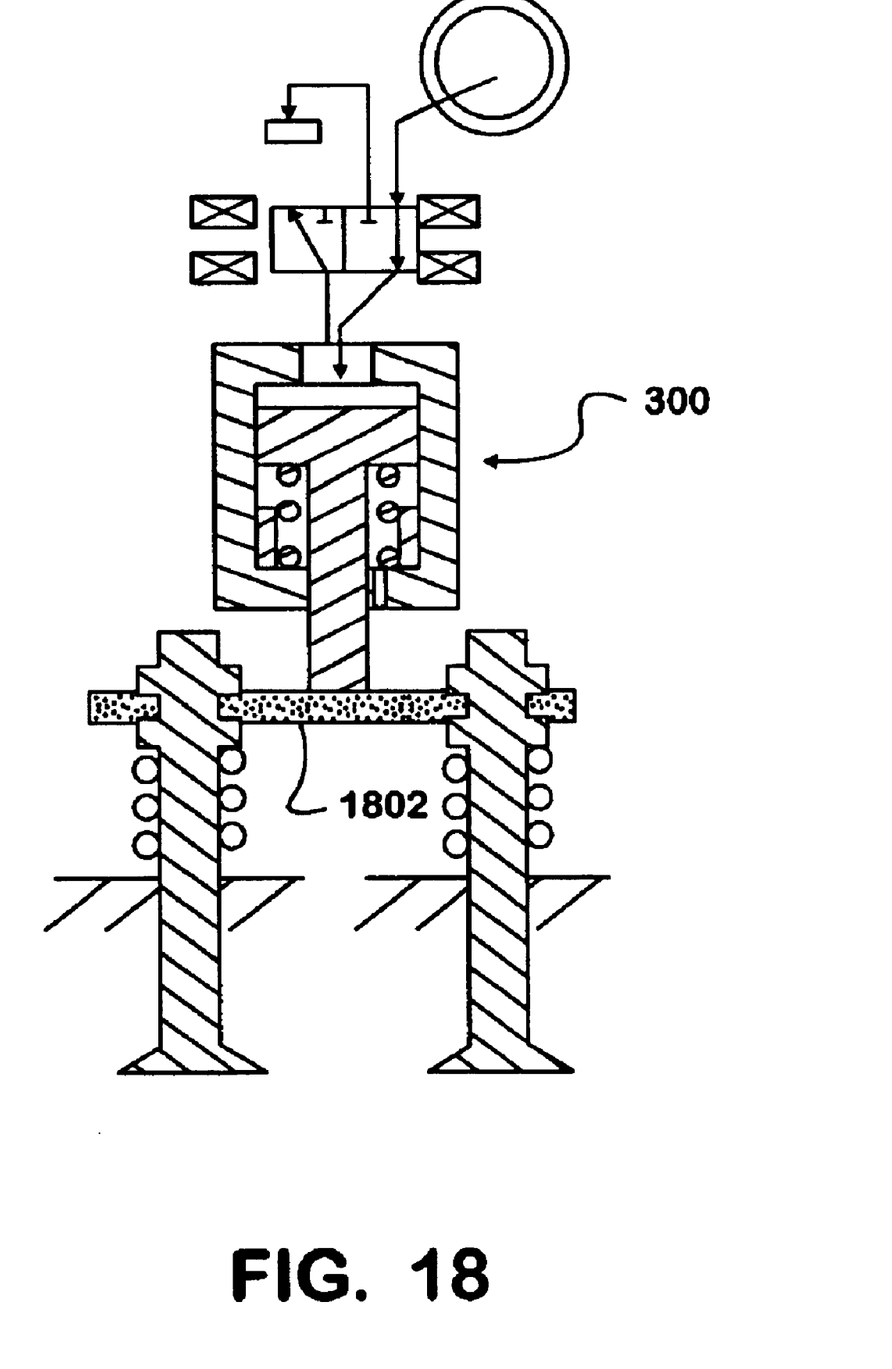
FIGS. 18–20 illustrate various alternative embodiments in accordance with the present invention.
Figure 19:
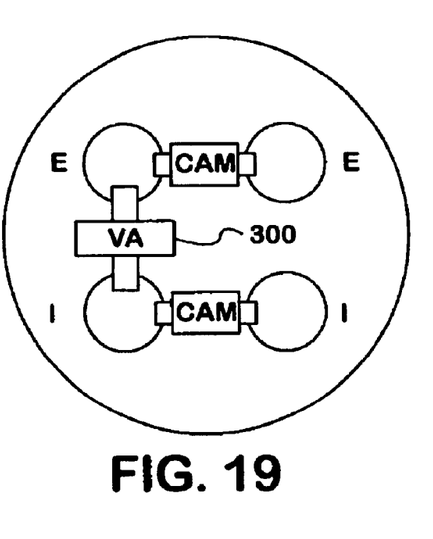
Figure 20:
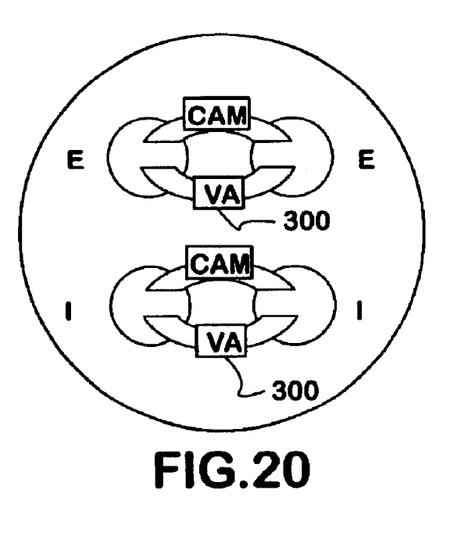

In the foregoing specification, the invention has been described with reference to specific embodiments. However, those of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. For example, FIG. 18 illustrates a scenario in which a single valve actuator 300 engages a valve bridge 1802, thereby providing simultaneous control of two engine valves. Furthermore, as shown in FIGS. 19 and 20, such a bridging arrangement could be used to engage various combinations of valves in a multi-valve engine. In FIG. 19, a single valve actuator 300 is used to simultaneously control a single exhaust valve and a single intake valve. In FIG. 20, a pair of valve actuators 300 control corresponding pairs of exhaust valves and intake valves.

It should be further noted that the present invention is not limited to the particular type of valve actuator described above, i.e., a pressure-actuated hydraulic piston arrangement. Those having ordinary skill in the art will recognize that other functionally-equivalent arrangements may be equally employed. Also, the examples described above generally illustrated scenarios in which a valve actuator is applied to the valves of a single combustion chamber. However, the present invention is not limited in this regard and could be applied to any number of engine valves corresponding to one or more combustion chambers.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus.

The invention has been described and illustrated with respect to certain preferred embodiments by way of example only. Those skilled in that art will recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

What is claimed is:

1. A method comprising the steps of:

operatively coupling a valve actuator to at least one intake valve of an internal combustion engine, wherein the at least one intake valve is controlled in part by operation of a fixed timing mechanism;

controlling operation of the at least one intake valve via the valve actuator independent of position of the fixed timing mechanism to regulate engine gas flow;

wherein the controlling step is provided independently for each cylinder of the internal combustion engine.

2. The method of claim 1, wherein the valve actuator is controllable to effectuate variable levels of internal exhaust gas recirculation in the internal combustion engine.

3. An improved internal combustion engine of the type having at least one combustion chamber coupled to at least two valves, the at least two valves comprising at least one intake valve and at least one exhaust valve, wherein operation of the at least two valves is controlled in part by operation of a fixed timing mechanism, the improvement comprising:

a valve actuator, operatively coupled to at least the at least one intake valve of the at least two valves, for controlling operation of the at least one valve independent of position of the fixed timing mechanism, wherein the valve actuator is controllable to regulate engine gas flow.

4. The improved internal combustion engine of claim 3, further comprising digital control means, coupled to the valve actuator, for controlling operation of the valve actuator.

5. The improved internal combustion engine of claim 3, wherein the valve actuator further comprises a limiter for limiting a range of operation of the at least one valve.

6. A diesel engine comprising the improved internal combustion engine of claim 3.

7. The improved internal combustion engine of claim 3, wherein the valve actuator is controllable to effectuate variable levels of internal exhaust gas recirculation.

8. The improved internal combustion engine of claim 3, wherein the at least two valves are each controllable independent of position of the fixed timing mechanism, such that each of the at least two valves is capable of opening at any position of the fixed timing mechanism and such that each of the at least two valves is capable of closing at any position of the fixed timing mechanism.

9. The improved internal combustion engine of claim 3, wherein the valve actuator comprises a pressure-actuated piston, the improved internal combustion engine further comprising:

a source of pressurized hydraulic fluid; and a fluid control valve operatively coupled between the source of pressurized hydraulic fluid and the pressure-actuated piston, wherein operation of the fluid control valve regulates application of the pressurized hydraulic fluid to the pressure-actuated piston to control operation of the pressure-actuated piston.

10. The improved internal combustion engine of claim 3, further comprising digital control means, coupled to the fluid control valve, for controlling operation of the fluid control valve.

11. An internal combustion engine comprising:

at least one combustion chamber;

at least two valves coupled to the combustion chamber, the at least two valves comprising at least one intake valve and at least one exhaust valve, wherein operation of the at least two valves is controlled in part by operation of a fixed timing mechanism and independent of operation of other valves for each combustion chamber other than the at least one combustion chamber;

a valve actuator, operatively coupled to at least one valve of the at least two valves, for controlling operation of the at least one valve independent of position of the fixed timing mechanism;

a turbocharger comprising:

a turbine coupled to a compressor;

an input port operatively positioned to receive exhaust gases from the combustion chamber via the at least one exhaust valve to thereby drive the turbine and the compressor; and an output port operatively positioned to provide pressurized air received from the compressor to the combustion chamber via the at least one intake valve, wherein the valve actuator and turbocharger are controllable to regulate engine gas flow.

12. The internal combustion engine of claim 11, wherein the turbocharger comprises a variable nozzle turbocharger.

13. The improved internal combustion engine of claim 11, wherein the valve actuator further comprises a limiter for limiting a range of operation of the at least one valve.

14. A diesel engine comprising the internal combustion engine of claim 11.

15. The internal combustion engine of claim 11, wherein the valve actuator and turbocharger are controllable to effectuate variable levels of internal exhaust gas recirculation.

16. The internal combustion engine of claim 11, wherein the at least two valves are each controllable independent of position of the fixed timing mechanism, such that each of the at least two valves is capable of opening at any position of the fixed timing mechanism and such that each of the at least two valves is capable of closing at any position of the fixed timing mechanism.

17. In an internal combustion engine having at least one combustion chamber coupled to at least two valves, the at least two valves comprising at least one intake valve and at least one exhaust valve, wherein operation of the at least two valves is controlled in part by operation of a fixed timing mechanism, a method for effectuating internal exhaust gas recirculation, the method comprising:

operatively coupling a valve actuator to at least one valve of the at least two valves;

controlling operation of the at least one valve via the valve actuator independent of position of the fixed timing mechanism and independent of engine operating condition to regulate engine gas flow.

18. The method of claim 17, wherein the valve actuator is coupled to the at least one intake valve, and wherein controlling operation of the at least one valve further comprises advancing opening of the at least one intake valve.

19. The method of claim 17, wherein the valve actuator is coupled to the at least ne intake valve, and wherein controlling operation of the at least one valve further comprises retarding closing of the at least one intake valve.

20. The method of claim 17, wherein the valve actuator is coupled to the at least one exhaust valve, and wherein controlling operation of the at least one valve further comprises advancing opening of the at least one exhaust valve.

21. The method of claim 17, wherein the valve actuator is coupled to the at least one exhaust valve, and wherein controlling operation of the at least one valve further comprises retarding closing of the it least one exhaust valve.

22. The method of claim 17, wherein the valve actuator further comprises a pressure-actuated piston, the method further comprising:

operatively coupling a source of pressurized hydraulic fluid to the pressure-actuated piston; and regulating application of the pressurized hydraulic fluid to the pressure-actuated piston to control operation of the pressure-actuated piston.

23. The method of claim 17, wherein controlling operation of the at least one valve further comprises controlling operation of the at least one valve to effectuate variable levels of internal exhaust gas recirculation.

24. The method of claim 17, wherein the at least two valves are each controllable independent of position of the fixed timing mechanism, such that each of the at least two valves is capable of opening at any position of the fixed timing mechanism and such that each of the at least two valves is capable of closing at any position of the fixed timing mechanism.

25. In an internal combustion engine having at least one combustion chamber coupled to at least two valves, the at least two valves comprising at least one intake valve and at least one exhaust valve, wherein operation of the at least two valves is controlled in part by operation of a fixed timing mechanism, and wherein a turbocharger is operatively positioned to receive exhaust gases from the combustion chamber via the at least one exhaust valve and to provide pressurized air to the combustion chamber via the at least one intake valve, a method for effectuating internal exhaust gas recirculation, the method comprising:

operatively coupling a valve actuator to at least one valve of the at least two valves;

controlling operation of the at least one valve via the valve actuator independent of position of the fixed timing mechanism to effectuate Internal exhaust gas recirculation; and controlling operation of the turbocharger to regulate engine gas flow by at least controlling operation of the turbocharger to effectuate variable levels of internal exhaust gas recirculation.

26. The method of claim 25, wherein the valve actuator is coupled to the at least one intake valve, and wherein controlling operation of the at least one valve further comprises advancing opening of the at least one intake valve.

27. The method of claim 25, wherein the valve actuator is coupled to the at least one intake valve, and wherein controlling operation of the at least one valve further comprises retarding closing of the at least one intake valve.

28. The method of claim 25, wherein the valve actuator is coupled to the at least one exhaust valve, and wherein controlling operation of the at least one valve further comprises advancing opening of the at least one exhaust valve.

29. The method of claim 25, wherein the valve actuator is coupled to the at least one exhaust valve, and wherein controlling operation of the at least one valve further comprises retarding closing of the at least one exhaust valve.

30. The method of claim 25, wherein controlling operation of the turbocharger further comprises adjusting nozzle vane closure of the turbocharger.

31. The method of claim 25, wherein the at least two valves are each controllable independent of position of the fixed timing mechanism, such that each of the at least two valves is capable of opening at any position of the fixed timing mechanism and such that each of the at least two valves is capable of closing at any position of the fixed timing mechanism.

* * * * *